(12) United States Patent
Wang et al.

(10) Patent No.: US 7,246,736 B2
(45) Date of Patent: Jul. 24, 2007

(54) SUPPLYING SHIELDING GAS

(75) Inventors: Pei-Chung Wang, Troy, MI (US); Toshinori Sakai, Yokohama (JP)

(73) Assignees: General Motors Corporation, Detroit, MI (US); Suzuki Motor Corporation, Shizuoka (JP)

( * ) Notice: Subject to any disclaimer, the term of this patent is extended or adjusted under 35 U.S.C. 154(b) by 114 days.

(21) Appl. No.: 10/720,725

(22) Filed: Mar. 18, 2004

(65) Prior Publication Data

US 2005/0205647 A1  Sep. 22, 2005

(51) Int. Cl.
- B23K 31/02 (2006.01)
- B23K 35/38 (2006.01)
- B23K 31/12 (2006.01)
- B23K 9/00 (2006.01)
- B23K 9/12 (2006.01)

(52) U.S. Cl. .................. 228/219; 228/214; 228/103; 219/125.11; 219/74

(58) Field of Classification Search ............... 228/219, 228/214, 103, 74; 219/125.11, 74
See application file for complete search history.

(56) References Cited

U.S. PATENT DOCUMENTS

| | | | | |
|---|---|---|---|---|
| 3,197,611 A | * | 7/1965 | Morris et al. | 219/137.51 |
| 3,219,789 A | * | 11/1965 | Branch et al. | 219/60 R |
| 3,240,913 A | * | 3/1966 | Schubert | 219/60 R |
| 3,246,116 A | * | 4/1966 | Anderson et al. | 219/61 |
| 3,450,857 A | * | 6/1969 | Webb | 219/74 |
| 3,736,400 A | * | 5/1973 | Spiegel et al. | 219/60 A |
| 4,179,059 A | * | 12/1979 | Chang et al. | 228/103 |
| 4,340,804 A | * | 7/1982 | Krieg | 219/137.41 |
| 4,357,512 A | * | 11/1982 | Nishimoto et al. | 219/608 |
| 4,488,032 A | * | 12/1984 | Case et al. | 219/124.34 |
| 4,532,405 A | * | 7/1985 | Corby et al. | 219/124.34 |
| 4,532,406 A | * | 7/1985 | Povlick et al. | 219/124.34 |
| 4,839,490 A | * | 6/1989 | DeSaw | 219/74 |
| 4,857,701 A | * | 8/1989 | Slavens | 219/125.12 |
| 5,081,334 A | * | 1/1992 | Copher et al. | 219/74 |
| 5,187,343 A | | 2/1993 | Edwards | |
| 5,440,100 A | * | 8/1995 | Stuart et al. | 219/137.31 |
| 5,471,031 A | * | 11/1995 | Dailey et al. | 219/121.46 |
| 5,601,225 A | * | 2/1997 | Wood et al. | 228/9 |
| 5,669,547 A | | 9/1997 | Spring | |
| 6,270,453 B1 | * | 8/2001 | Sakai | 600/141 |
| 6,888,972 B2 | * | 5/2005 | Berg et al. | 385/12 |

* cited by examiner

*Primary Examiner*—Jonathan Johnson
*Assistant Examiner*—Rachel E. Beveridge
(74) *Attorney, Agent, or Firm*—Kathryn A. Marra

(57) ABSTRACT

A flexible articulate tubular device has a shank, a plurality of pivot rings, and a terminus with heat sensors and a fiber optic device. The flexible articulate tubular device is initially positioned, either manually or automatically, near a target weld path with the aid of the fiber optic device. The flexible articulate tubular device is then more precisely articulated to direct the terminus along the target weld path, with the aid of the heat sensors. As such, the flexible articulate tubular device operates in a heat seeking manner to follow the weld bead. Ultimately, a gaseous flux is supplied along the flexible articulate tubular device and toward the target weld path, so as to blast the weld bead with an anti-oxidation shield gas and thereby protect the weld.

15 Claims, 3 Drawing Sheets

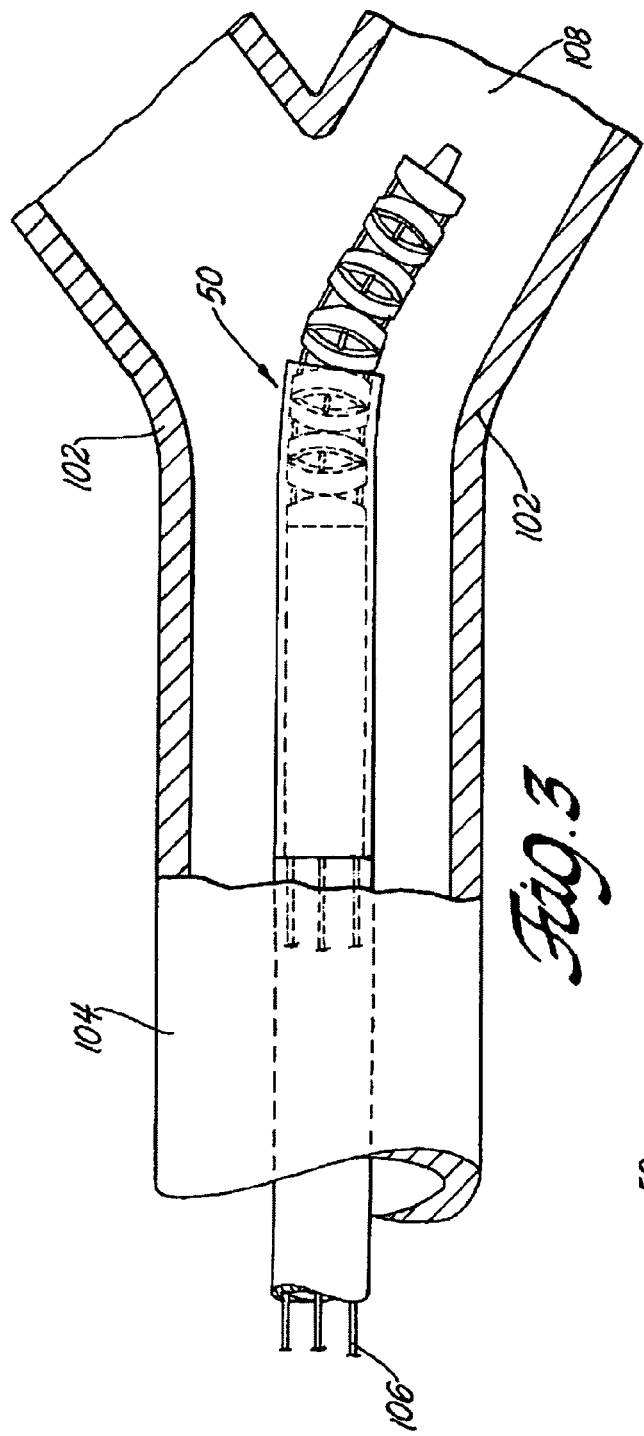
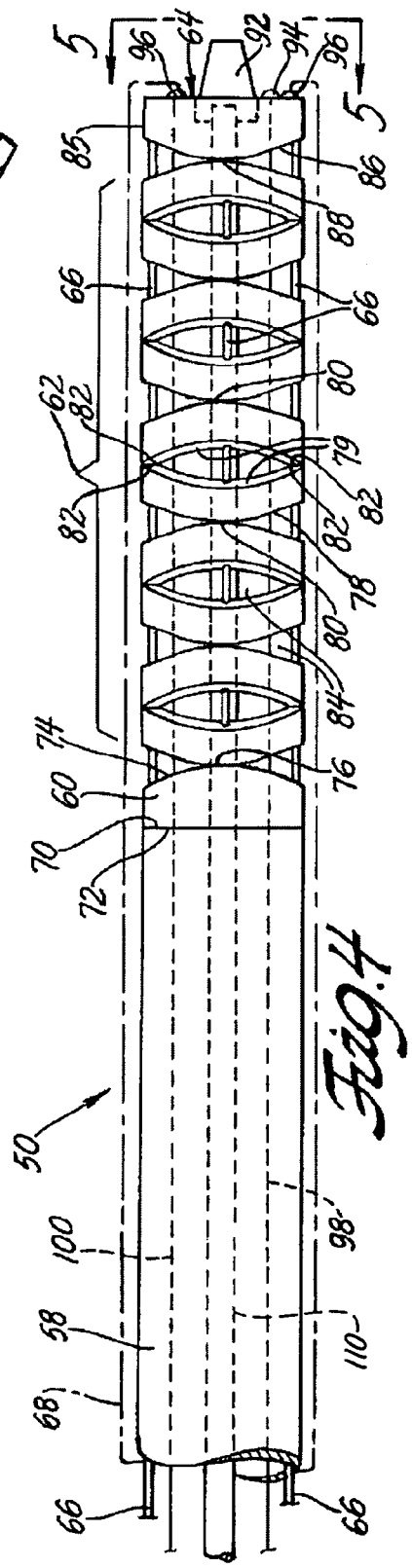

SUPPLYING SHIELDING GAS

TECHNICAL FIELD

The present invention relates generally to metal fusion bonding and, more particularly, to an apparatus and method for applying a gaseous flux to a metal fusion bonding location.

BACKGROUND OF THE INVENTION

Various welding techniques are widely used in the construction of automobile body assemblies. For example, plasma arc welding is increasingly useful in a wide variety of metal fusion bonding applications. Plasma arc welding typically involves assembling two or more metal components together to establish a weld joint location, then concentrating heat generated by an electric arc to join the metal components at the weld joint location by fusion of the parent materials of the metal components and/or by fusion of the parent materials and a filler metal, usually provided by a consumable electrode.

For example, tungsten-inert gas (TIG) welding is a process that uses arc plasma from a nonconsumable tungsten electrode that is mounted in a special welding torch and that radiates heat onto a work surface to create a weld puddle. The heat travels by conduction from the weld puddle to melt the desired depth of weld. Metal-inert gas (MIG) welding is similar to TIG welding, except that a consumable electrode is typically used and carbon dioxide may also be used for the shielding gas.

To achieve optimal weld quality, a weld bead must be shielded with a protective atmosphere to protect it against detrimental effects of oxidation prior to, during, or subsequent to joining the metal components. Accordingly, a continuous flow of gaseous flux is typically applied to the joining location to expel the ambient atmosphere to prevent oxidation and thereby promote better union of the metal components. Such gaseous flux typically involves a shielding gas composed of a chemically inert gas such as helium, argon, and the like. During welding, the gaseous flux may protect the work from oxidation, and may clean or catalytically enter into the reaction between the materials being united. Therefore, the welding torch, or a separate gas nozzle, typically blasts the top surface of the weld bead with a continuous stream of shielding gas.

Likewise, it is desirable to provide a supply of shielding gas to an underside of the weld bead, opposite of the welding torch location. Accordingly, various types of devices have been developed for supplying the underside of the weld bead with gaseous flux. But, such devices usually involve supplying a large quantity of shielding gas, which tends to be an expensive substance.

Tubular structures are often joined using TIG and MIG welding, such as in automotive body assembly operations. It is conventional in TIG and MIG welding to purge and replace the interior atmosphere of tubular structures to be welded with an inert gas. A common practice involves filling the entire tubular structure with a shield gas throughout the entire welding operation. Unfortunately, this practice tends to be wasteful and expensive because an excessive amount of shield gas gets applied to the underside of the weld bead. Alternatively, other practices involve the use of purge blocks, dams, or plugs, which provide shield gas in a more localized fashion proximate the weld bead in order to conserve shield gas. Unfortunately, however, such devices still result in the application of an unnecessary amount of shield gas. Still other practices employ rigid apparatuses for insertion within tubular structures for delivering shield gas in a more localized fashion. Unfortunately, however, such apparatuses are too inflexible to navigate bends in tubular structures and are only adapted to supply shield gas to a flat circular-shaped weld bead.

Thus, it is an object of the present invention to provide a method and an apparatus for metal fusion bonding that overcomes the shortcomings identified in the prior art above. It is a further object of the present invention to provide a method and an apparatus for metal fusion bonding wherein gaseous flux may be point-specifically applied to a relatively difficult-to-access side of a workpiece such as an underside of a weld bead within a tubular structure. It is yet a further object to provide a method and apparatus for metal fusion bonding that operates in a fixed or dynamic articulating mode and according to linear or non-linear paths.

SUMMARY OF THE INVENTION

The present invention satisfies the objects mentioned above by providing a method and apparatus for metal fusion bonding, preferably in the welding of tubular components to produce an automobile frame. More specifically, the present invention provides a method and means by which a shielding gas may be accurately directed at a leading edge of a weld bead from an underside of a workpiece assembly, regardless of whether the weld bead is laid in a flat circular-shaped path, a sinusoidal circular-shaped path, or an otherwise irregular path.

The method generally involves providing a flexible articulate tubular device that has a shank, a plurality of pivot rings, and a terminus with heat sensors and a fiber optic device. The flexible articulate tubular device is initially positioned, either manually or automatically, near a target weld path with the aid of the fiber optic device. The flexible articulate tubular device is then more precisely articulated to direct the terminus along the target weld path, with the aid of the heat sensors. As such, the flexible articulate tubular device operates in a heat seeking manner to follow the weld bead. Ultimately, a gaseous flux is supplied along the flexible articulate tubular device and toward the target weld path, so as to blast the weld bead with an anti-oxidation shield gas and thereby protect the weld.

BRIEF DESCRIPTION OF THE DRAWINGS

These and other aspects and advantages of the present invention will become apparent upon reading the following detailed description in combination with the accompanying drawings, in which:

FIG. 3 is a broken-out cross-sectional view of a branched tubular structure wherein the flexible articulate tubular device is illustrated navigating a bend;

FIG. 4 is an enlarged plan view of the flexible articulate tubular device of FIG. 2.

DESCRIPTION OF THE PREFERRED EMBODIMENT

In general, the present invention provides a method and apparatus for applying a gaseous flux to a metal fusion bonding location between two or more components. Often, it is necessary to apply gaseous flux to an underside or backside of a weld bead that occupies a difficult-to-reach location. For example, it is difficult to perform point-specific application of shielding gas to an underside of a weld bead between two tubular components that are used in the construction of an automobile frame. Moreover, it can also be difficult to perform point-specific application of shielding gas to the undersides of other components such as those having deep C-shaped channels, or other complex geometry. Accordingly, while the present invention will be described below with reference to an example of an automobile frame using tubular structures, the present invention is also well suited to welding of a wide variety of other components for other types of structures.

Figure 1:
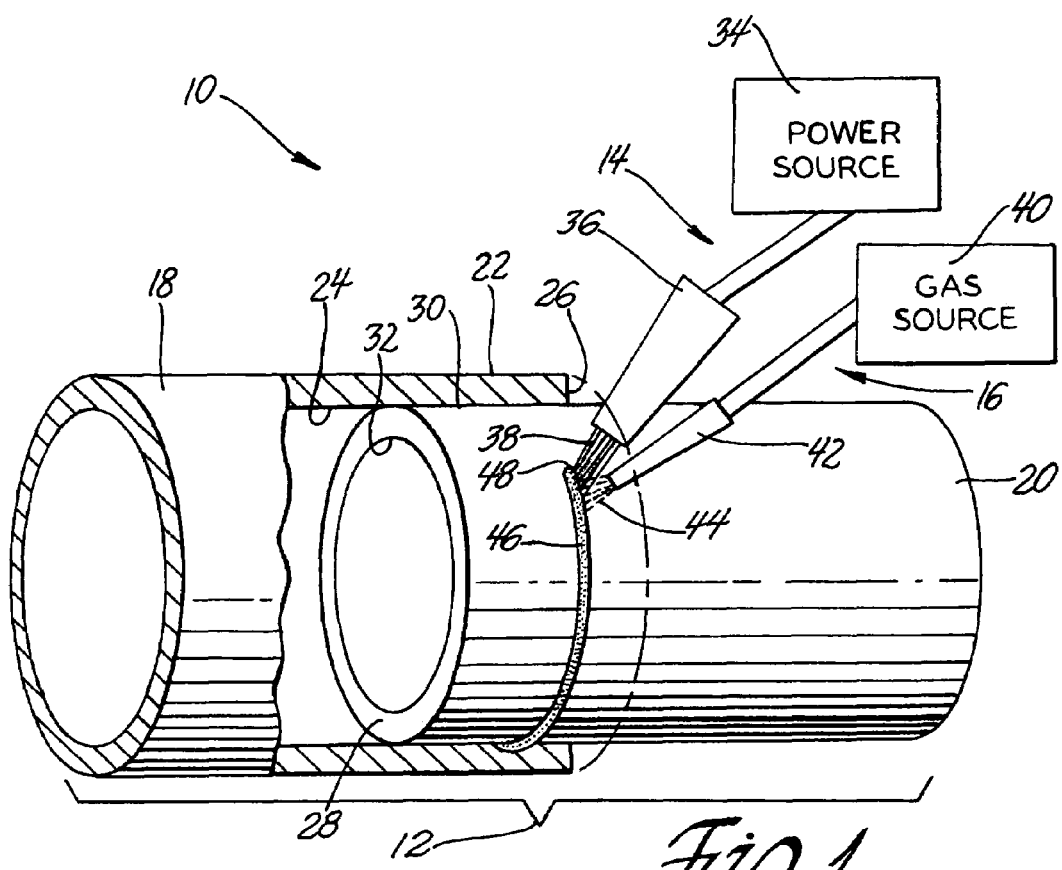
FIG. 1 is a broken-out perspective view of two tubular components being welded together using a lap weld bead.

Referring specifically now to the Figures, there is illustrated in FIG. 1 a typical plasma arc welding setup 10, that generally includes a workpiece assembly 12, a welding apparatus 14, and a shield gas apparatus 16. It is contemplated that the shield gas apparatus and the welding apparatus could be integrated together into a single apparatus, as is well known in the art.

The workpiece assembly 12 includes a first tubular component 18 and a second tubular component 20 inserted within the first tubular component 18 to constitute a tubular structure ready for welding. The first tubular component 18 includes an outside diameter 22, an inside diameter 24, and an end 26. Correspondingly, the second tubular component 20 includes an end 28, an outside diameter 30 that mates with the inside diameter 24 of the first tubular component 18, and an inside diameter 32. As shown, the workpiece assembly 12 is configured for a lap weld. Alternatively, however, the workpiece assembly 12 may be configured for a butt weld, wherein the ends 26, 28 of the tubular components 18, 20 are abutted together. Typically, however, butt welds are performed on tubular components that have similar diameters. In any case, the tubular components 18, 20 may be composed of any metal materials including aluminum and steel.

The welding apparatus 14 is preferably a plasma arc-welding apparatus, but may be any other type including laser, arc welding, gas flame welding apparatus, and the like. The welding apparatus 14 includes a power source 34 such as a constant current, AC/DC power supply available from Origin Electric Co., Ltd., Tokyo, Japan. As is well known in the art of plasma arc welding, a plasma control console (not shown) can be added to a conventional power source. The power source 34 is connected to a welding torch 36 as is also well known in the art. The welding torch 36 is positioned proximate the outer diameter 22 of the first tubular component 18, and may include a consumable or non-consumable electrode (not shown). The welding apparatus 14 produces a plasma arc 38 that provides the energy necessary to fuse the tubular components 18, 20 together.

The shield gas apparatus 16 includes a gas source 40 such as a tank pressurized with a gaseous flux such as helium, argon, or the like. Gaseous flux, or shield gas, is a substance that is used to promote the fusing of metals by preventing oxidation of the weld during the fusing process. The gas source 40 is connected to a nozzle 42 as is well known in the art. The nozzle 42 is positioned proximately the welding torch 36, preferably just behind the welding torch 36 in terms of the direction of the welding operation. Alternatively, the shield gas apparatus 16 may be fully integrated with the welding apparatus 14 such that the welding torch 36 and nozzle 42 are integrated, wherein shield gas flows coaxially along the electrode (not shown). The shield gas apparatus 16 produces a flow pattern of shield gas 44 that flows out of the nozzle 42.

In operation, there is relative movement between the welding torch 36, nozzle 42, and the workpiece assembly 12, preferably by rotating the workpiece assembly 12 using rotatable fixturing, which is not shown here but which is well known in the art. Correspondingly, the welding torch 36 and nozzle 42 are held in fixed relation to the workpiece assembly 12. Accordingly, a circular, uniform target weld path is established between the components by the rotation of the workpiece assembly and the stationary position of the nozzles. The target weld path is described as being between the components, which means that the target weld path is any path along which a weld bead will be laid so as to fuse the components together. In other words, the target weld path need not be a uniform circular path and can take any form such as a sinusoidal path, or an irregular or otherwise wavy or non-circular path.

When the welding process is initiated, the rotatable fixtures rotate, the welding apparatus 14 establishes the plasma arc 38 between the welding torch 36 and the workpiece assembly 12, and the shield gas apparatus 16 creates the shield gas pattern 44, thereby creating a weld bead 46 around the workpiece assembly 12. The weld bead 46 is shown having a leading edge 48 proximate the welding torch 36.

Plasma arc welding is an increasingly desirable process for use in high volume welding of tubular components. But, this process not only requires application of shield gas on the outside or front side of the workpiece assembly 12 as performed by the shielding gas apparatus, but it also requires the application of a shield gas on the inside or an underside of the workpiece assembly. As shown in FIG. 1, the outside or front side of the workpiece assembly 12 means on top of or radially outward of the outside diameter 22 of the first tubular component 18. Likewise, the inside or underside of the workpiece assembly 12 means beneath or radially inward of the inside diameter 32 of the second tubular component 20. According to the prior art, the full interior of the tubular components, or just portions thereof, are completely filled with a shield gas so as to flood the underside of the weld bead.

Figure 2:
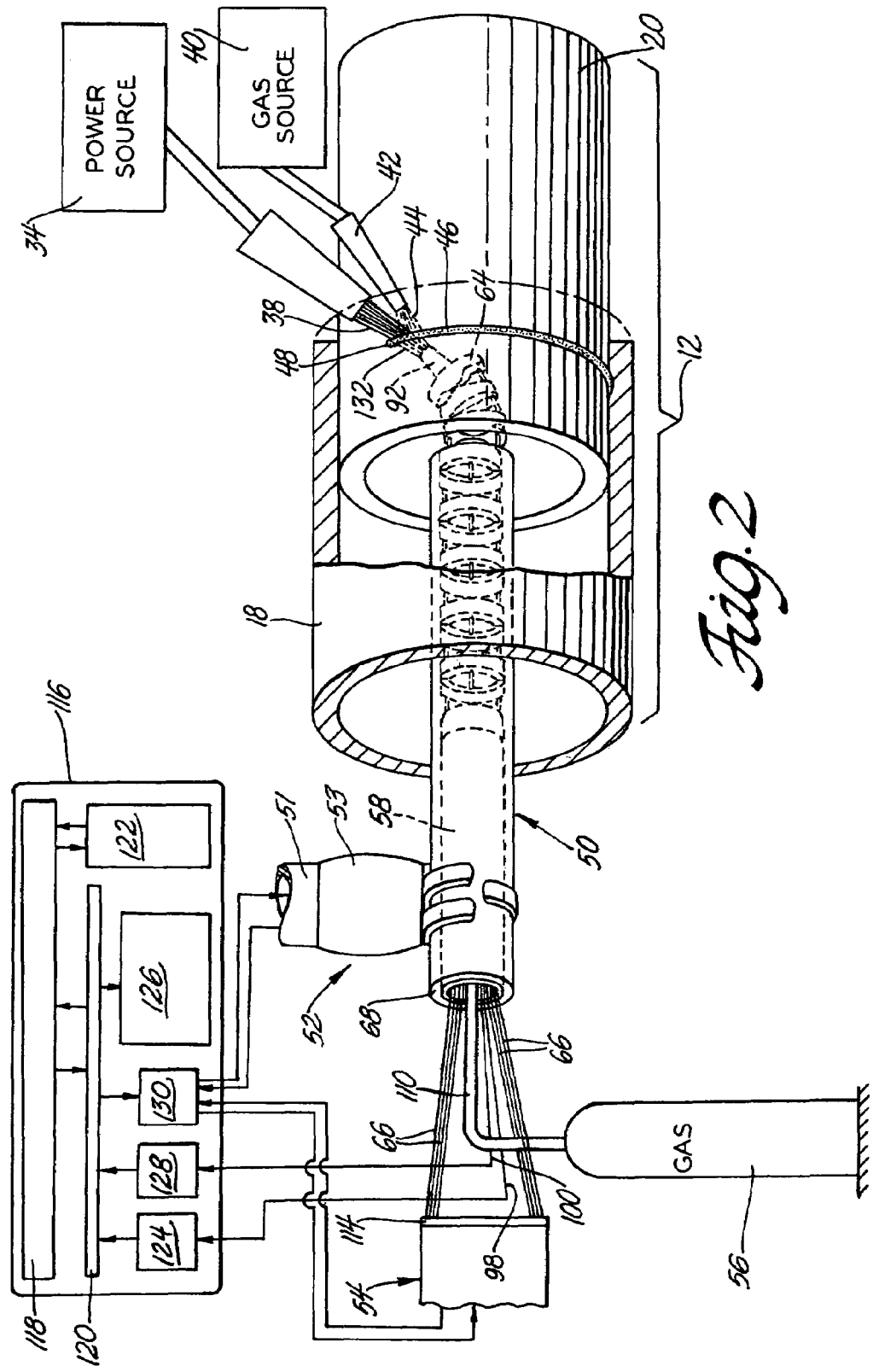
FIG. 2 is a broken-out perspective view of the two tubular components of FIG. 1, further illustrating a shielding gas being applied to an underside of the lap weld bead by a flexible articulate tubular device and related controls according to the present invention.

Instead, as shown in FIG. 2, the present invention provides a means for point-specific application of shield gas to an underside of the weld bead. Specifically, a flexible articulate tubular device 50 is extended into the interior of the workpiece assembly 12. The flexible articulate tubular device 50 is operated by a position drive device 52 and an articulation drive device 54, and is supplied with shielding gas by a gas supply apparatus 56.

Referring now to FIG. 4, there is illustrated an enlarged view of the flexible articulate tubular device 50 of the present invention. While the flexible articulate tubular device 50 will be described below in detail, the present invention is not limited thereto. In other words, a wide variety of flexible articulate tubular devices is readily available and is adaptable for use with the principles of the present invention. Such flexible articulate tubular devices are very common in surgical applications, such as endoscopes used in endoscopic exams and surgery. In any case, the flexible articulate tubular device 50 generally includes tubular elements defined by a shank 58, a base pivot ring 60, a plurality of pivot rings 62, and a terminus 64. The flexible articulate device 50 also includes control wires 66, and a protective sheath 68.

The shank 58 is a generally cylindrical tubular member and provides a means by which the flexible articulate tubular device 50 may be rigidly grasped and maneuvered, such as by the position drive device 52 of FIG. 2. Still referring to FIG. 4, the shank 58 is preferably composed of stainless steel so as to avoid oxidation and corrosion when exposed to a harsh welding environment, but may be composed of any other materials as well. The shank 58 may be produced by cutting a portion of tube stock and has a distal end 70. Accordingly, the flexible articulate tubular device 50 may be easily manipulated or traversed into a desired initial working position.

The base pivot ring 60 is disposed just axially forward of the shank 58 and is generally cylindrical and tubular in shape. Also the base pivot ring 60 is preferably composed of the same material as the shank 58, and may also be produced by cutting a portion from tube stock. The base pivot ring 60 includes a flat base surface 72 that mounts flush against the distal end 70 of the shank 58. Opposite the base surface 72, the base pivot ring 60 includes an undulating surface 74 having a protruding portion 76 that extends in a generally axially forward direction. Preferably, the undulating surface 74 has a sinusoidal shape such that the undulating surface 74 is symmetrical wherein the protruding portion 76 is mirrored with an oppositely disposed protruding portion (not shown).

The pivot rings 62 are disposed just axially forward of the base pivot ring 60. Each pivot ring 62 is generally cylindrical and tubular in shape, is preferably composed of the same material as the shank 58, and may also be produced by cutting portions from tube stock. In contrast to the base pivot ring 60, each pivot ring 62 includes not just one but two opposing undulating surfaces 78, 79. As with the undulating surface 74 of the base pivot ring 60, the undulating surfaces 78, 79 of the pivot rings 62 are preferably sinusoidal in shape such that two protruding portions 80, 82 are formed 180 degrees from one another on each of the axial sides of each pivot ring 62. The pivot rings 62 are arranged such that the protruding portions 80, 82 of the mating sides of adjacent pivot rings 62 are in direct contact. The pivot rings 62 may be identical in shape and cut sequentially from tube stock. Thereafter, in creating the stack of pivot rings 62, each pivot ring 62 is successively disposed just axially forward of a previously placed pivot ring 62 such that the pivot rings 62 are oriented and stacked in back-to-back relation. Accordingly, this arrangement establishes mutual spaces 84 between the back-to-back pivot rings 62.

The terminus 64 is disposed just axially forward of the forward most of the pivot rings 62. The terminus 64 is defined in part by a terminal pivot ring 85 that is substantially similar to the base pivot ring 60. The terminal pivot ring 85 includes an undulating surface 86 that is preferably sinusoidal in shape such that the undulating surface 86 is symmetrical wherein a protruding portion 88 is matched by an oppositely disposed protruding portion (not shown). Opposite the undulating surface 86 is a flat end surface 90 wherein a nozzle 92 of the terminus 64 is mounted thereto.

Figure 5:
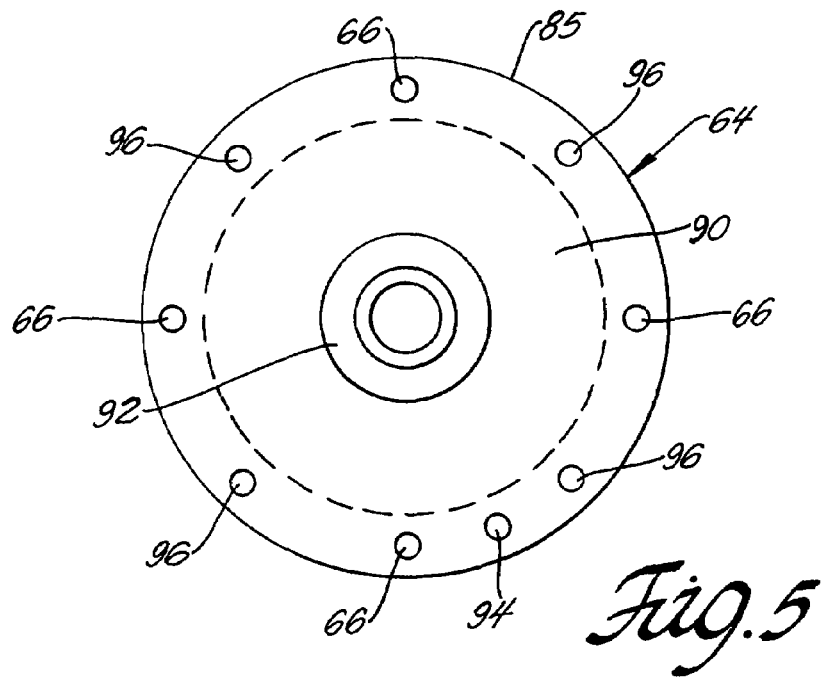
FIG. 5 is an enlarged end view of a terminus segment of the flexible articulate tubular device of FIG. 4.

Referring now to FIGS. 4 and 5, the terminus 64 is also defined by a fiber optic element 94 and a plurality of heat seeking elements or thermal responsive devices 96 mounted to the end surface 90 of the terminal pivot ring 85. The fiber optic element 94 may be a PIN diode, an APD photodiode, an IDP photodiode, and the like, and may also include a light source (not shown) to illuminate the welding operation. Preferably, a quantity of four thermal responsive devices 96 are equidistantly spaced amongst the four equidistantly spaced control wires 66. The thermal responsive devices 96 are also preferably thermocouple devices, but may also take the form of any other heat sensor device. Referring again to FIG. 4, the fiber optic element 94 is connected to a fiber optic cable 98 running through the interior of the flexible articulate tubular device 50. Likewise, the thermal responsive devices 96 are connected to wires 100 extending through the flexible articulate tubular device 50.

Similarly, the control wires 66 extend longitudinally or axially through the shank 58, the base pivot ring 60, the plurality of pivot rings 62, and the terminal pivot ring 85, where the control wires 66 are fastened such as by thermal adhesion, chemical adhesive, or by extending through the end surface 90 of the terminal pivot ring 85 and staking or otherwise enlarging the ends of the control wires 66. Each of the various tubular elements 58, 60, 62, 85 preferably include four axial passages (not shown) extending therethrough and spaced ninety degrees apart in circumferential alignment with the protruding portions. The axial passages may be drilled or may be formed during an extrusion process in manufacturing the tube stock from which the various tubular elements 58, 60, 62, 85 of the flexible articulate tubular device 50 are produced. In any case, the control wires 66 retain the various tubular elements 58, 60, 62, 85 of the flexible articulate tubular device 50 together.

The protective sheath 68 is illustrated in fragmentary or broken-out views in FIGS. 2 and 3, but is shown in hidden view in FIG. 4. Referring to FIG. 4, the protective sheath 68 covers the shank 58, pivot rings 60, 62, 85, and control wires 66 so as to protect these elements and the fiber optic cable 98 and electrical wires 100 against weld spatter, heat, and gasses generated during welding. The sheath 68 may be composed of flexible metal foil, an imbricate tubular-shaped metal jacket, and the like. Thus, the sheath may loosely enclose the shank 58 and pivot rings 60, 62 and may be fastened or welded to the circumferential periphery of the terminal pivot ring 85. Accordingly, the sheath 68 may flex in concert with the rest of the flexible articulate tubular device 50.

The flexible articulate tubular device 50 is flexible and articulate largely because of the unique shape and arrangement of the pivot rings 60, 62, 85. The protruding portions 76, 80, 82 of the mating sides of adjacently disposed pivot rings 60, 62, 85 are in direct contact to establish fulcrum points about which adjacent pivot rings 60, 62, 85 may pivot with respect to one another, to close the gaps or mutual spaces 84. The articulating motion of the flexible articulate tubular device 50 is accomplished by applying a tensile force to one or more of the control wires 66. When a tensile force is applied to one control wire 66 at a time, the pivot rings 62, 85 tend to pivot toward the pull direction of that control wire 66, thereby tending to close all of the mutual spaces 84 between the pivot rings 60, 62, 85 along that particular control wire 66. When a tensile force is applied equally to two adjacent control wires 66 (as opposed to oppositely disposed control wires), the pivot rings 62, 85 will tend to pivot in a resultant direction between the two adjacent control wires 66. Accordingly, tensile force may be applied to any combination of the control wires 66 to effect resolute articulation of the flexible articulate tubular device 50, as exemplified in FIG. 3.

FIG. 3, illustrates the flexible articulate tubular device 50 navigating a bend in a bifurcated tubular structure, wherein tension has been applied to a lowermost control wire so as to direct the flexible articulate tubular device 50 down a lowermost channel of the bifurcated tubular structure.

As shown in FIG. 4, a flexible gas line 110 has one end that is fastened or press fit to the terminal pivot ring 85 and in communication with the nozzle 92. The flexible gas line 110 is preferably composed of a flexible and durable metal tube or the like. The flexible gas line 110 extends rearward from the terminus 64, through the pivot rings 62, 60 and shank 58 and connects to the gas supply apparatus 56 shown in FIG. 2.

Referring again to FIG. 2, the control wires 66 extend rearward out of the shank 58 and are fastened or tied to a control plate 114. In turn, the articulation drive device 54 is attached to the control plate 114 in any well known manner of robot grasping or attachment.

A control module 116 is provided for controlling the flexible articulate tubular device 50, wherein the control module 116 receives input of temperature and optics and transmits output vectors for positioning the flexible articulate tubular device 50. The control module 116 includes a controller 118 having interface electronics 120, and a memory 122. The interface electronics 120 may conform to protocols such as RS-232, parallel, small computer system interface, and universal serial bus, etc. Moreover, the interface electronics 120 may include circuits or software. The controller 118 may be configured to provide control logic that provides the functionality for the articulation of the flexible articulate tubular device 50. In this respect, the controller 118 may encompass a microprocessor, a microcontroller, an application specific integrated circuit, and the like. The controller may be interfaced with the memory 122, which is configured to provide storage of computer software that provides the functionality of the flexible articulate tubular device 50 and that may be executed by the controller. The memory 122 may also be configured to provide a temporary storage area for data and can be RAM, ROM, EPROM, and the like.

The control module 116 further includes an optics module 124, which receives and processes output from the fiber optic device 94 of FIGS. 4 and 5. Still referring to FIG. 2, the optics module 124 preferably includes an optical receiver that may have digital camera imaging electronics for capturing a visual of the welding location and converting same to video format for display on a video screen 126. Accordingly, an operator can see inside the workpiece assembly 12 and manually manipulate the flexible articulate tubular device 50 to initially position same in accordance with the welding location. Alternatively, the control module 116 could include a pattern recognition routine that would analyze the visual signals from the fiber optic device 94, compare such signals to a predetermined pattern, calculate differentials therebetween, and generate and send output signals based thereon to the position drive device 52 for positioning the flexible articulate tubular device 50 in accordance with the desired welding location.

The control module 116 also includes a thermal analysis module 128 that receives and processes output from the thermal responsive devices 96. The thermal analysis module 128 receives output from the four thermal responsive devices 96 and, based thereon, resolves a magnitude and direction of the source of heat, namely the leading edge 48 of the weld bead 46, which corresponds to the location of the plasma arc 38 from the welding torch 36.

Finally, the control module 116 includes a motion controller 130 that receives output from the thermal analysis module 128 and/or the optics module 124 via the controller. The motion controller 130 includes an algorithm for converting the output from the thermal analysis module 128 and/or the optics module 124 into motion control commands. The motion control commands are communicated to the drive devices 52, 54, whereby the drive devices move so as to translate the flexible articulate tubular device 50 and one or more of the control wires 66 to thereby articulate the flexible articulate tubular device 50 and maintain the terminus 64 thereof in correspondence with the leading edge 48 of the weld bead 46.

The present invention also involves a method of metal fusion bonding wherein the flexible articulate tubular device 50 is used. The flexible articulate tubular device 50 is positioned at the underside of the components of the workpiece assembly 12 in correspondence with the target weld path. In the example illustrated in the drawing figures, the underside of the components happens to be within an interior thereof. In any case, the flexible articulate tubular device 50 may be positioned manually with the aid of the video screen 126. Alternatively, the positioning may be automatically effectuated using the pattern recognition routine of the control module 116, in which case visual signals are conveyed from the terminus of the flexible articulate tubular device 50 to the fiber optic receiver of the optics module 124. The visual signals are then processed by the pattern recognition routine and then the flexible articulate tubular device 50 is translated and articulated in response to the visual signals via the pattern recognition routine.

Next, the flexible articulate tubular device 50 is articulated to direct the terminus 64 along the target weld path. The articulation is carried out using a heat seeking function of the present invention. Temperature is measured at the four different locations of the thermal responsive devices 96 at the terminus 64 of the flexible articulate tubular device 50. The thermal responsive devices 96 of the terminus 64 provide output thermal signals to the thermal analysis module 128, which analyzes the temperature differentials between the different thermal responsive devices and resolves a target direction that corresponds to the location of the heat source. Accordingly, the thermal responsive devices 96 in concert with the thermal analysis module 128 provide a heat-seeking function of the present invention, wherein the flexible articulate tubular device 50 follows highest temperature readings emanating from a weld bead within any desired predetermined following distance, preferably 1-10 millimeters. The thermal analysis module 128 also resolves a magnitude along the target direction of the flexible articulate tubular device 50. A predetermined algorithm or look-up table may be provided which includes an empirically determined formula or data set that is correlated with the values of the output signals to output a desired value for displacing the flexible articulate tubular device 50 the desired magnitude.

Gaseous flux is supplied along, and preferably through, the flexible articulate tubular device 50 out of the terminus 64 and toward the target weld path. The gaseous flux originates in the gas supply apparatus 56 and travels through the flexible gas feed line 110 and out of the nozzle 92.

Accordingly, the present invention provides a method and means by which shielding gas may be accurately blasted at a leading edge of a weld bead from the underside of a workpiece assembly so as to prevent oxidation to an underside of a weld as it is being formed.

The method of the present invention may be performed as a computer program and the various thermal inputs may be stored in memory as a look-up table or the like. The computer program may exist in a variety of forms both active and inactive. For example, the computer program can exist as a software program comprised of program instructions in source code, object code, executable code or other formats; a firmware program; or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the graphics display classes, their extensions, or document-producing programs on a CD ROM or via Internet download. In a sense, the Internet itself, as an abstract entity, is a computer readable medium. The same is true of computer networks in general. It is therefore to be understood that the method of the present invention may be performed by any electronic device capable of executing the above-described functions.

It should be understood that the invention is not limited to the embodiments that have been illustrated and described herein, but that various changes may be made without departing from the spirit and scope of the invention. Accordingly, it is intended that the invention not be limited to the disclosed embodiments, but that it have the full scope permitted by the language of the following claims.

What is claimed is:

1. A method of metal fusion bonding components together, said method comprising:
providing a flexible articulate tubular device separate from welding apparatus for producing metal fusion for bonding the components, the articulate tubular device having an inlet at one end of the tubular device for receiving a supply of gaseous flux and an other end of the tubular device for discharge of gaseous flux, the flexible articulate tubular device further comprising a plurality of pivot rings and wherein one of the plurality of pivot rings is a terminal pivot ring, a control module comprising a motion controller comprising electronics and an articulation drive device operatively connected to the plurality of pivot rings;
articulating said flexible articulate tubular device to direct said terminal pivot ring along a target weld path to be progressively formed between said components, and wherein said articulating said flexible articulate tubular device comprises communicating motion control commands from the motion controller to the articulating drive device causing the articulating drive device to pivot at least one of the plurality of pivot rings; and
supplying a gaseous flux along said flexible articulate tubular device, out said other end of the tubular device, and toward said target weld path as it is progressively formed, and positioning the flexible articulate tubular device so as to trace said target weld path.

2. The method of metal fusion bonding as recited in claim 1, further comprising maintaining the position of said terminal pivot ring of said flexible articulate tubular device in accordance with the position of a leading edge of a weld bead along said target weld path.

3. The method of metal fusion bonding as recited in claim 1, wherein said articulating is conducted in accordance with said target weld path having an irregular path.

4. The method of metal fusion bonding as recited in claim 1, wherein said supplying involves extending a gas feed line through said flexible articulate tubular device.

5. The method of metal fusion bonding as recited in claim 1, further comprising initially positioning said flexible articulate tubular device in relation to said components.

6. The method of metal fusion bonding as recited in claim 5 wherein the terminal pivot ring further comprises an optic element, and further comprising:
conveying visual signals from said optic element of said flexible articulate tubular device; and
translating and articulating said flexible articulate tubular device in response to said visual signals.

7. The method of metal fusion bonding as recited in claim 1, wherein said components comprise at least a pair of tubular components.

8. The method of metal fusion bonding as recited in claim 7, wherein said articulating comprises articulating said flexible articulate tubular device within said at least a pair of tubular components.

9. A method as set forth in claim 1 wherein the flexible articulate tubular device further comprises a protective sheath over the plurality of pivot rings.

10. A method as set forth in claim 1 wherein the flexible articulate tubular device further comprises a plurality of wires attached to the plurality of pivot rings and connected to the articulation drive device for applying a tensile force to one or more of the plurality of pivot rings.

11. A method as set forth in claim 1 wherein the flexible articulate tubular device further comprises a position drive device and further comprising communicating motion control commands from the motion controller to the position control device to articulate said flexible articulate tubular device.

12. A method as set forth in claim 1 wherein each one of the plurality of pivot rings comprises two opposing undulating surfaces forming two protruding portions fanned at 180 degrees from each other on each of the axial sides of each pivot ring such that mating sides of adjacent pivot rings are in direct contact.

13. A method of metal fusion banding components together, said method comprising:
providing a flexible articulate tubular device separate from welding apparatus for producing metal fusion for bonding the components, the articulate tubular device having an inlet at one end of the tubular device for receiving a supply of gaseous flux and an other end of the tubular device for discharge of gaseous flux, the flexible articulate tubular device further comprising a plurality of pivot rings and wherein one of the plurality of pivot rings is a terminal pivot ring, a control module comprising a motion controller comprising electronics and an articulation drive device operatively connected to the plurality of pivot rings;
articulating said flexible articulate tubular device to direct said terminal pivot ring along a target weld path to be progressively formed between said components, and wherein said articulating said flexible articulate tubular device comprises communicating motion control commands from the motion controller to the articulating drive device causing the articulating drive device to pivot at least one of the plurality of pivot rings; and
supplying a gaseous flux along said flexible articulate tubular device, out said other end of the tubular device, and toward said target weld path as it is progressively formed further comprising initially positioning said flexible articulate tubular device in relation to said components wherein the terminal pivot ring further comprises an optic element, and further comprising:

conveying visual signals from said optic element of said flexible articulate tubular device; and translating and articulating said flexible articulate tubular device in response to said visual signals further positioning said flexible articulate tubular device so as to trace said target weld path.

14. A method of metal fusion bonding components together, said method comprising:

providing a flexible articulate tubular device separate from welding apparatus for producing metal fusion for bonding the components, the articulate tubular device having an inlet at one end of the tubular device for receiving a supply of gaseous flux and an other end of the tubular device for discharge of gaseous flux, the flexible articulate tubular device further comprising a plurality of pivot rings and wherein one of the plurality of pivot rings is a terminal pivot ring, a control module comprising a motion controller comprising electronics and an articulation drive device operatively connected to the plurality of pivot rings;

articulating said flexible articulate tubular device to direct said terminal pivot ring along a target weld path to be progressively formed between said components, and wherein said articulating said flexible articulate tubular device comprises communicating motion control commands from the motion controller to the articulating drive device causing the articulating drive device to pivot at least one of the plurality of pivot rings; and supplying a gaseous flux along said flexible articulate tubular device, out said other end of the tubular device, and toward said target weld path as it is progressively formed and wherein the terminal pivot ring comprises a thermal responsive device, further positioning the flexible articulate tubular device so as to trace the target weld path comprising measuring temperature, using the thermal responsive device, at two or more locations at said terminal pivot ring of said flexible articulate tubular device.

15. The method of metal fusion bonding as recited in claim 14 wherein said further positioning further comprises articulating said flexible articulate tubular device in response to said measuring temperature.

* * * * *

UNITED STATES PATENT AND TRADEMARK OFFICE
CERTIFICATE OF CORRECTION

| | | |
|---|---|---|
| PATENT NO. | : 7,246,736 B2 | Page 1 of 1 |
| APPLICATION NO. | : 10/720725 | |
| DATED | : July 24, 2007 | |
| INVENTOR(S) | : Wang et al. | |

It is certified that error appears in the above-identified patent and that said Letters Patent is hereby corrected as shown below:

Title Page: (22) change Filing Date to read -- Nov. 24, 2003 --.

Signed and Sealed this

Fourth Day of December, 2007

JON W. DUDAS
*Director of the United States Patent and Trademark Office*